United States Patent [19]

Leibersberger et al.

[11] Patent Number: 4,754,478

[45] Date of Patent: Jun. 28, 1988

[54] METHOD OF ADDING ADDITIONAL SUBSCRIBERS AND SIGNALS TO EXISTING CONNECTION

[75] Inventors: Helmut Leibersberger, Munich; Eduard Zwack, Puchheim; Heinz Zander, Munich, all of Fed. Rep. of Germany

[73] Assignee: Siemens Aktiengesellschaft, Berlin and Munich, Fed. Rep. of Germany

[21] Appl. No.: 908,250

[22] Filed: Sep. 17, 1986

[30] Foreign Application Priority Data

Sep. 27, 1985 [DE] Fed. Rep. of Germany ....... 3534547

[51] Int. Cl.⁴ .............................................. H04M 3/56
[52] U.S. Cl. ..................................... 379/204; 379/271
[58] Field of Search ............... 379/202, 204, 205, 209, 379/201, 215, 271

[56] References Cited

U.S. PATENT DOCUMENTS 4,419,753  12/1983  Kojima et al. ...................... 379/201
4,544,804  10/1985  Herr et al. ........................... 379/204

FOREIGN PATENT DOCUMENTS 3246051  6/1984  Fed. Rep. of Germany ...... 379/204

*Primary Examiner*—James L. Dwyer
*Attorney, Agent, or Firm*—Hill, Van Santen, Steadman & Simpson

[57] ABSTRACT

After the initiation of the offering of additional telephone paths or audible signals, the existing telephone connection is reswitched onto two subscriber inputs of a conference or offering device provided with the conference switching matrix array and arranged in a peripheral unit being reswitched by way of control devices and switching matrix arrays arranged in digital telephone switching systems. The two subscribers are connected via a preset conference switching matrix array. The additional telephone paths or audible signals are conducted to a further subscriber input of the conference or offering device with the assistance of the control devices and with the assistance of the switching matrix arrays and are designationally switched onto the existing connection in the conference or offering device via the conference switching matrix array. The method of the present invention serves for the realization of a subscriber's service features "offering" and "rapping" whose central functions are the offering of the third telephone path and the offering of audible offering signals onto an existing telephone connection or, respectively, the offering of audible rapping signals onto an existing telephone connection.

5 Claims, 2 Drawing Sheets

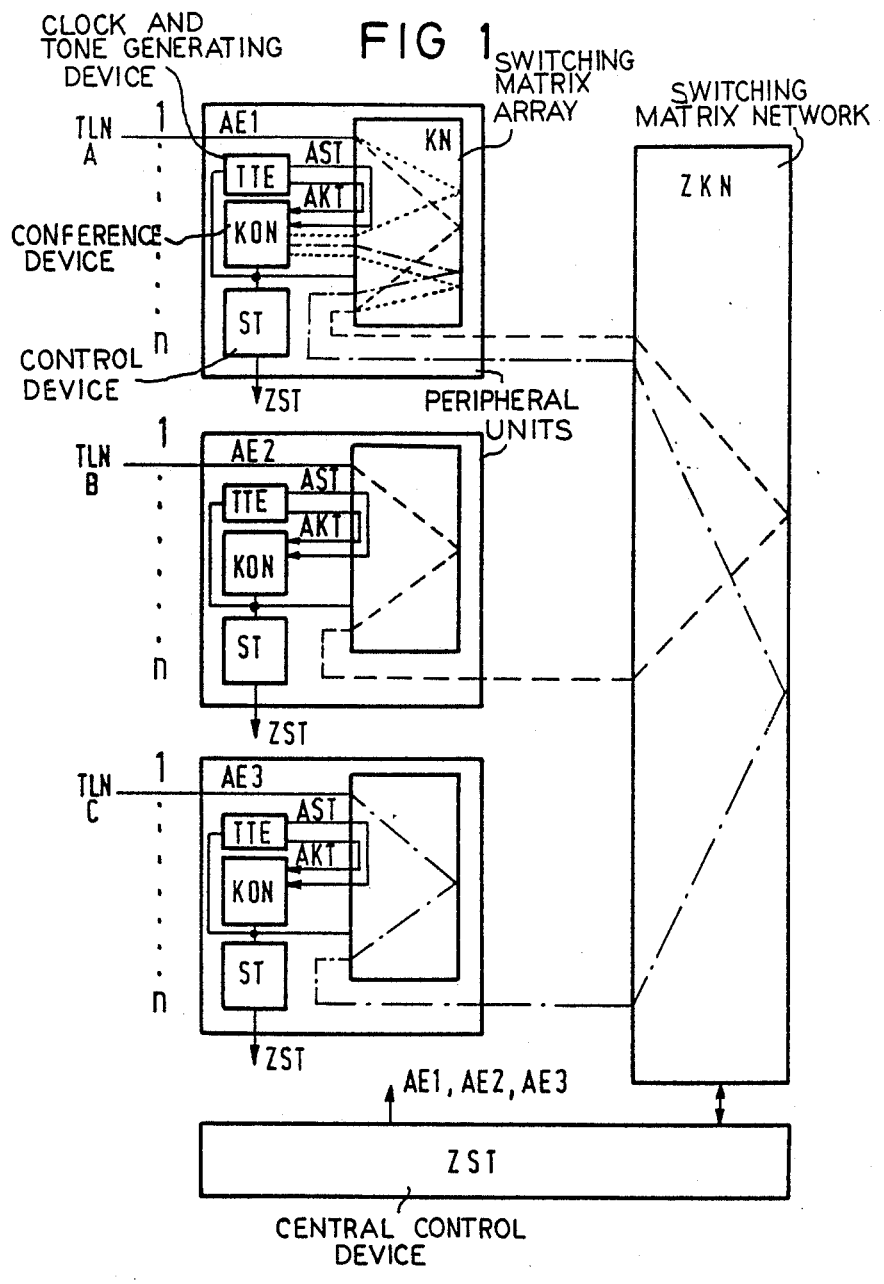

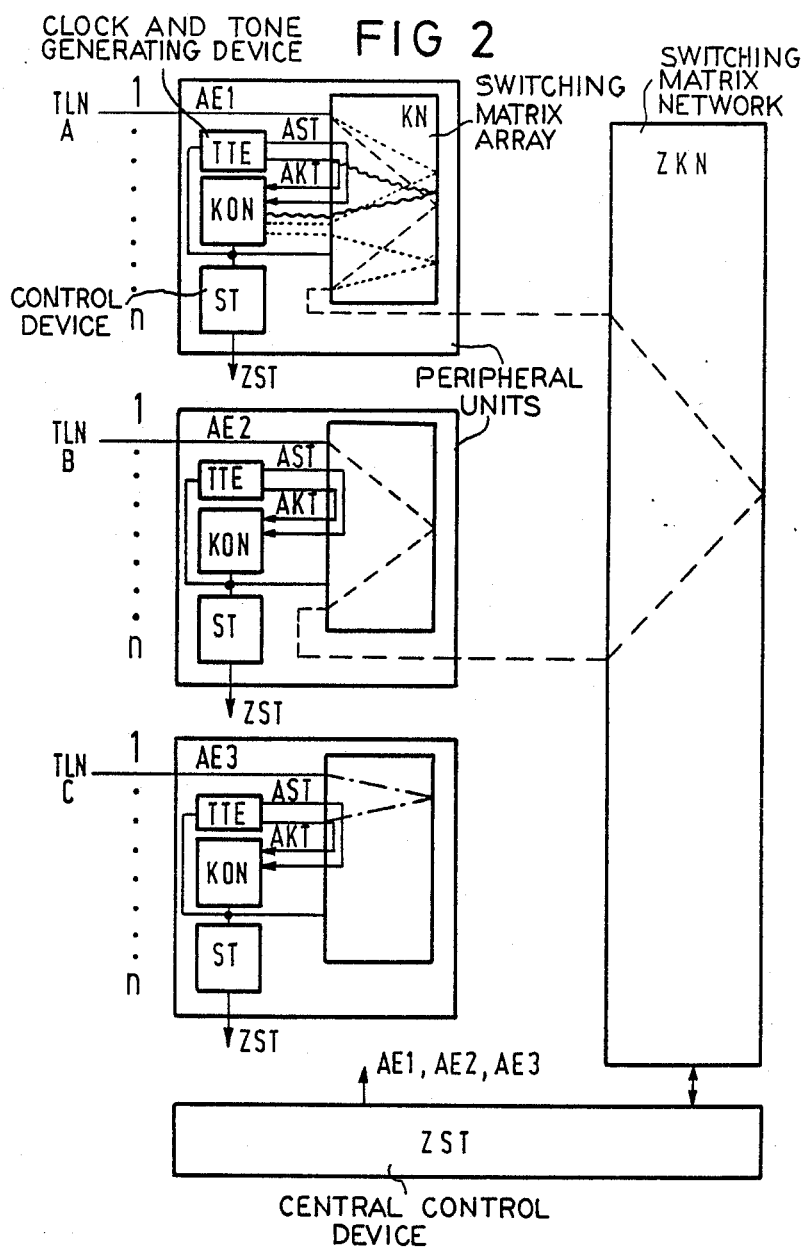

METHOD OF ADDING ADDITIONAL SUBSCRIBERS AND SIGNALS TO EXISTING CONNECTION

BACKGROUND OF THE INVENTION

1. Field of the Invention

The present invention relates to a method for connecting additional telephone paths and audible signals onto an existing connection between two subscriber stations which are connected together via digital, peripheral unit-associated switching matrix arrays and a digitial, central switching matrix array and central control device.

2. Description of the Prior Art

It is standard in analog telephone switching systems to connect additional telephone paths via additional windings of a repeater arranged in an existing telephone connection. Audible signals such as, for example, rapping or audible offering signals proceed to the subscribers via relay contacts connected at times to the existing telephone connection. The offering of additional telephone paths in such telephone switching systems requires involved measures with respect to level matching of the telephone paths to one another. A "designational rapping", i.e. transmission of the audible rapping signals to only one subscriber of existing telephone connection is not possible.

With the assistance of central control devices and with the assistance of digital switching matrix arrays, digital telephone switching systems allow the offering of an additional telephone path onto an existing telephone connection; but here, also, additional measures with respect to the level matching are required when connecting the telephone paths. In digital telephone switching systems, the subscribers surface feature "rapping" is usually realized in that the audible rapping signals are fit to an input of a switching matrix array and are briefly connected to an existing telephone connection in the direction of one subscriber and the telephone paths of this direction between the subscribers is briefly interrupted. After the brief connection of the audible rapping signals, the interruption of the telephone path effective in one direction is, in turn, cancelled by the central control device and by the switching matrix array. The connection of the audible rapping signals and the elimination of the interruption of the telephone paths are carried out in regular intervals until the generally administratively-defined rapping intervals have been reached. This continuous switching of the telephone path leads, first of all, to a higher load on the central control device and to an increased status message traffic between the switching system components and, secondly, leads to a destruction of the listening relationship of the subscribers of the existing connection.

The present invention relates to a method for offering additional telephone paths and audible signals onto a telephone connection existing between two subscribers in a telephone switching system of whose subscribers are connected via digital, peripheral unit-associated switching matrix arrays and via a digital, central switching matrix array, as well as by way of central control devices and controlled devices arranged in the peripheral units, whereby the peripheral units comprise the equipment for conference or, respectively, offering connections and comprise clock and tone generation.

The German published application No. 3,246,051 discloses a circuit arrangement telephone switching system wherein call progress tone signals are fed into an existing connection by way of a mixture provided for conference and offering connections. For this purpose, the mixer is equiped with a call progress tone memory and with a feed device and is connected into an existing connection by way of a first switching matrix stage or by way of first and second switching matrix stages. This assumes the connection or, respectively, the insertion of the mixture during the connection setup for every connection allowing the offering of call progress tone.

SUMMARY OF THE INVENTION

The object of the present invention is to provide a method for offering additional telephone paths and audible signals onto an existing telephone connection by way of the aforementioned type of telephone switching system such that the mixture or, respectively, the device for conference or offering connections, is used in accordance with the requirement of offering, interruptions of the existing telephone paths thereby being avoided and a designational offering of the audible signals, particularly of the audible rapping signals is enabled.

The above object is achieved, according to the present invention, in such a system as particularly characterized in that, after the initiation of the offering of additional telephone paths audible signals, the existing telephone connection is reswitched onto two subscriber inputs of a conference or offering device provided with a conference switching matrix array, being reswitched by way of the control devices and by way of a switching matrix array of a peripheral unit by way of which the telephone connection is established and conducted, and the two subscribers are connected via the preset conference switching matrix array of the conference or offering device. The additional telephone paths or audible signals are likewise conducted to further subscriber inputs of the same conference or offering device with the assistance of control devices and of the switching matrix arrays, and these additional telephone paths and audible signals are designationally connected to the existing telephone connection via the conference or offering switching matrix networks with the assistance of the conference or offering device.

A particular advantage of the present invention is that a conference or offering device is inserted into an existing connection only given the presence of an offering request and no additional measures for level matching and switching matrix control are required given the interconnection of a plurality of telephone paths since the conference devices already existing in telephone switching systems or conference connections are co-incorporated in the method. Due to the time-division multiplex method for switching matrix arrays utilized in digital telephone switching systems, the existing telephone connection also remains free of an interruption during the reswitching to the conference device.

According to an advantageous feature of the invention, the invention is further particularly characterized in that, due to the initiation of the offering by a third subscriber, this subscriber's additional telephone path established via a further peripheral unit inserting the transmission of voice information is switched to a subscriber input of the conference or offering device of the same peripheral unit with the assitance of the control devices by way of the central switching matrix array and the switching matrix array of the peripheral unit assigned to the subscriber dialed by the third subscriber. The audible offering signals generated by the clock and tone generating device are transmitted to an input of the switching matrix array of the same peripheral unit and are assigned to a further subscriber input of the conference or offering device by way of the switching matrix array and the control device of the peripheral unit. The additional telephone path and the audible offering signals are switched onto the existing telephone connection in the conference or offering device.

According to another advantageous feature of the invention, the service feature "rapping" is realized. The feature of the method is particularly characterized in that, due to the initiation of the offering by a third subscriber, audible rapping signals are generated in the clock and tone generating device of that peripheral unit to the subscriber dialed by the third subscriber the audible rapping signals are transmitted to the input of the switching matrix array of the peripheral unit and are also switched by the control device thereof to a subscriber input of the conference or offering device. The audible rapping signals are designationally connected onto the existing connection with the assistance of the conference or offering device. The advantage obtained is that the offering of the audible rapping signals onto the existing telephone connection occurs without interruptions of the telephone connection, therefore, the listening relationship between the two telephone subscribers is not influenced.

In general, subscriber performance features which require the function of offering additional telephone paths or audible signals can be implemented in digital telecommunication switching systems in a short development time and economically on the basis of the method of the present invention. This is particularly true of the subscriber service features which administrations shall require in the future in telecommunication networks or which become possible or realizable for the first time on the basis of the method of the present invention.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block circuit diagram of the system components of a digital telecommunications network required for explaining the realization of the subscriber's service feature "offering" as well as the connections in accordance with the present inventions; and FIG. 2 is a block circuit diagram, similar to that of FIG. 1, illustrating the system components for the realization of the subscriber's service feature "rapping" and, likewise, the connections in accordance with the method of the present invention.

DESCRIPTION OF THE PREFERRED EMBODIMENTS

As mentioned above, FIG. 1 illustrates those components of a digital telecommunications switching system required for the explanation of the present invention. More specifically, FIG. 1 illustrates three subscribers TLNA, TLNB, TLNC connected to the switching system. All subscribers, even those referenced 1 . . . n, are connected via telecommunication networks (not shown) to the peripheral units AE1, AE2 and AE3 of the telecommunications switching system. Each peripheral unit AE1, AE2, AE3 is equiped with a switching matrix array KN, a conference or offering device KON, a clock and tone generating device TTE, and a control device ST. The block circuit diagram of FIG. 1 also illustrates a switching matrix network ZKN and a central control device ZST. The telecommunications switching system's switching matrix network composed of blocking-free time-divisional multiplex stages is constructed in two stages, whereby the first switching matrix array stage KN is assigned to the peripheral AE1, AE2, AE3 and the second switching matrix array stage is assigned to the central control area and is referenced as the central switching matrix array ZKN. As a consequence of the dynamic requirements, the switching oriented control, as well as the security oriented and operational task, are divided between a central control device ZST and control devices ST in the peripheral units AE1, AE2, AE3. The communication of the control devices ST, ZST with one another occurs via separate connecting paths. The clock and tone generating device is TTE assigned to the peripheral units AE1, AE2, AE3 supply the clock and tone signals necessary for the telecommunications switching system such as, for example, audible rapping signals AKT and audible offering signals AST. The conference or, respectively, offering device KON which is likewise present peripheral unit AE1, AE2, AE3 serves for the formation of conference connections, its basic principal being comprised of linearizing the digital input voice information, algebratly adding the voice components of the conference subscribers, and companding the digital output voice signals for each subscriber.

By way of a telecommunications network (not shown), subscribers TLNA and TLNB are connected to the peripheral units AE1 or, respectively, AE2 and are connected to one another via the switching matrix arrays KN of the peripheral units AE1, AE2 as well as via the central switching matrix array ZKN (illustrated in FIG. 1 with broken lines). As standard in digital telecommunication switching networks, the connection is produced by way of the central control device ZST and the control devices ST of the peripheral units AE1 and AE2.

A further subscriber TLNC (with likewise connected to a further peripheral unit AE3 via a telecommunications network which is also not shown) dials the subscriber TLNA, whereupon the subscriber TLNC is informed of the busy state of the subscriber TLNA by way of a busy signal. Since the subscriber TLNC wishes to reach the subscriber TLNA immediately, the subscriber TLNC initiates the subscriber's service feature "offering" via his terminal equipment. As a consequence of the initialization of this subscriber's service feature, the offering of the telephone path of the subscriber TLNC and of the audible offering signals AST is initiated. With the assistance of the control device ST and of the switching matrix array KN of the peripheral unit AE1, the existing telephone connection between the subscriber TLNA and the subscriber TLNB is re-switched onto two subscriber inputs of the conference or offering device KON assigned to the peripheral unit AE1 (this being illustrated by the dotted lines in FIG. 1). Both of the subscribers TLNA and TLNB are therefore connected via the conference switching matrix array implemented in the conference or offering device KON. The telephone path of the subscriber TLNC (indicated by dot-dash lines in FIG. 1) is driven by the control device ST in the peripheral unit AE3 via its switching matrix array KN to the central switching matrix array ZKN and is switched by way of the central controller ZST via the central switching matrix array ZKN to an input of the switching matrix array KN of the peripheral unit AE1. By way of the control device ST, this switching matrix array KN connects the telephone path coming from the subscriber TLNC to a further subscriber input of the conference or offering device KON. The audible rapping and offering signals AST, AKT are fed via a connection constantly through-connected through the switching matrix array KN of the peripheral unit AE1 to two inputs of the conference or offering device KON provided for this purpose. The conference or offering device KON combines signals of the three telephone paths in a manner similar to a three-way conference connection and additionally connects the audible offering signals AST onto the three telephone paths such that they proceed to each of the three subscribers. An operating mode tailored for this purpose is required in the conference or offering device KON for the offering of audible offering signals AST since the audible offering signals AST are transmitted on a unit directional connection and, therefore, a summation of telephone signals and audible signals for the audible offering signal connection is eliminated. The fundamental technical procedures which are implemented in the conference or offering device KON are not affected by this operation.

Like FIG. 1, FIG. 2 illustrates the system components of the digital telephone switching system required for explanation of the present invention. The arrangement, as well as the functions of the system components corresponds to those set forth which are respect to FIG. 1.

The subscriber TLNA is connected to the subscriber TLNB via the same system components and by way of the same control device ST, ZST as in FIG. 1 and the connection is identical by dot-dash lines in FIG. 2. A subscriber TLNC 2, as in the case of FIG. 1, is connected to the switching device dials the subscriber TLNA, whereupon the subscriber TLNC is informed of a busy state of the subscriber TLNA by way of the busy signal. The subscriber TLNC initiates the subscriber service feature "rapping" via his terminal equipment in order to inform the subscriber TLNA that there is a connection request of a further subscriber. Due to the initialization of the subscriber's service feature, the control device ST reswitches the existing telephone connection between the subscribers TLNA and TLNB via the switching matrix array KN of the peripheral unit AE1 onto two subscriber inputs of the conference or offering device KON (shown with dotted lines in FIG. 2) assigned to the peripheral unit AE1. Both subscribers are therefore connected via the conference switching matrix array implemented in the conference or offering device KON. The auto rapping and offering signals AST, AKT, as shown in FIG. 1, are conducted to inputs of the conference or offering device KON. Alternatively, as shown by wavy lines in FIG. 2, a transmission of the audible signals AKT, AST via connections which are switched to subscriber inputs of the conference or offering device KN of the peripheral unit AE1 during the duration of a telephone connection in the switching matrix array KN of the peripheral unit AE1 is also possible. This conference or offering device KON switches the audible rapping signals AKT incoming at the subscriber input or at inputs provided for this purpose, switching the signals designationally onto the existing telephone connection so that the audible rapping signals AKT proceed only to the subscriber TLNA. A corresponding mode deviating from the conference connection mode is also required in the conference or offering device KON for this job since the summation of telephone and audible signals for the connection of the rapping tone is eliminated. In the peripheral unit AE3, the audible rapping signals AKT supplied from the clock and tone generating device TTE are transmitted to the subscriber TLNC view the switching matrix array KN set in the peripheral unit AE3 by the control device ST and via the telephone network (not shown).

When, due to the audible rapping signal AKT, the subscriber TLNB ends the conversation, the existing telephone connection is separated and the telephone path of the subscriber TLNA is immediately connected in a known manner to the telephone path (not shown) of the subscriber TLNC, this telephone path being preoccupied in the central switching matrix array and in the switching matrix array assigned to the peripheral unit AE3.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and preferably be included within the scope of our contribution to the art.

We claim:

1. In a telecommunications system of the type which comprises a plurality of peripheral units for connection to subscriber stations, in which each of the peripheral units comprises a clock and tone generating device, a connecting device, including a conference switching matrix, a control device, and a switching matrix, in which the control devices and a common control device control connections between subscriber stations via a central switching matrix, and in which a connection exists between first and second subscriber stations via respective switching matrices and the central switching matrix, an additional telephone pass and audible signals onto the existing connection comprising the steps of:

signalling a request for connection to one of the first and second subscriber stations from a third subscriber station;
  in response to the signalling of the connection request, switching the first and second subscriber stations to the inputs of the conference switching matrix of the requested one of the first and second subscriber stations;
  connecting an additional telephone path to a further subscriber input of the same conference switching matrix; and
  connecting the additional telephone path to the existing telephone connection via the conference switching matrix.

2. The method of claim 1, and further defined as:

connecting the additional telephone path via the peripheral unit assigned to the third subscriber station to the subscriber input of the connecting device of the requested subscriber station with the assistance of the control devices, the common control device and the central switching matrix and the switching matrix of the peripheral unit assigned to the requested subscriber station and signalled by the third subscriber station;

generating audible connection signals with the clock and tone generating device of the peripheral unit assigned to the requested subscriber; and connecting the audible signals onto the existing telephone connection.

3. The method of claim 1, and further defined as:

generating audible rapping signals in the clock and tone generating device of the peripheral unit assigned to the subscriber requested by the third subscriber and transmitting the audible rapping signals to the input of the switching matrix of that peripheral unit and switching the same under the control of the control device of that peripheral unit to a subscriber input of the respective conference switching matrix; and connecting the audible rapping signals onto the existing connection with the respective connecting device.

4. The method of claim 1, and further defined as:

generating audible signals in the clock and tone generating device and constantly feeding the same to a connection of the switching matrix of the peripheral units and to the audible signal inputs of the conference devices.

5. The method of claim 1, and further defined as:

generating audible signals in the clock and tone generating devices and feeding the same to a subscriber input of the connecting device for the duration of the existing telephone connection via the respective switching matrix of the peripheral units.

* * * * *